Feb. 24, 1925.
C. I. HALL
CURRENT METER
Filed Jan. 20, 1922
1,527,644
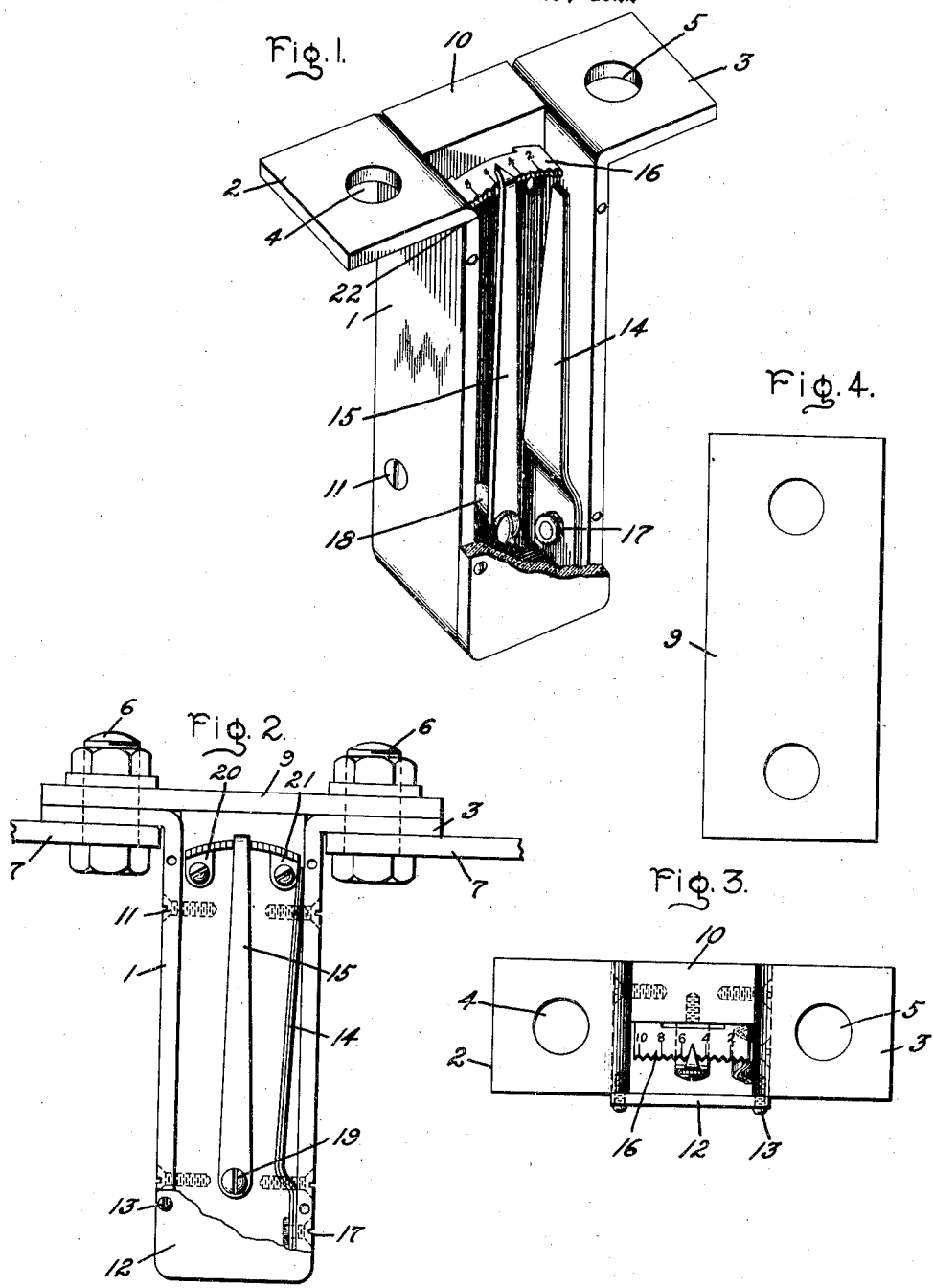
Inventor:
Chester I. Hall
by [signature]
His Attorney.

Patented Feb. 24, 1925.

1,527,644

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

CURRENT METER.

Application filed January 20, 1922. Serial No. 530,678.

*To all whom it may concern:*

Be it known that I, CHESTER I. HALL, a citizen of the United States, residing at Fort Wayne, in the county of Allen, State of Indiana, have invented certain new and useful Improvements in Current Meters, of which the following is a specification.

My invention relates to electrical instruments, particularly those for measuring current and its principal object is to provide a maximum reading ammeter which may be mounted directly in series with a feeder circuit. A further object of my invention is to provide an instrument which is rugged and economical in construction and capable of withstanding hard usage such as might be met with when installed in a street manhole. Other advantages of my invention will appear as the description proceeds.

The features which I believe to be novel and patentable will be pointed out in the claims appended hereto. The details of construction and manner of installing an instrument built in accordance with my invention will now be explained in connection with the accompanying drawings in which Figure 1 shows a perspective view of a maximum demand current meter built in accordance with my invention with the top cover and a portion of the side cover plates removed; Fig. 2 shows a front view of the instrument and the manner of attaching it in the circuit to be measured; Fig. 3 shows a top view of the same with the top cover plate removed, and Fig. 4 shows a plan view of one form of a top cover plate.

Referring now to the drawings in which like parts are indicated by like numerals, the current carrying elements of my maximum reading ammeter comprise a U-shaped strap 1 of copper or other conducting material having the upper end of the U bent at right angles to form terminal clips 2 and 3. These clips are provided with central holes 4 and 5 adapted to receive bolts 6, 6, by means of which the instrument may be connected to the terminals 7, 7 of an electric circuit. In the illustrations I have shown a cover plate 9 also held in position by the bolts 6, 6. This cover plate not only serves to close the top of the U-shaped conductor to prevent dirt from accumulating therein, but also serves to relieve the U-shaped member from strains incident to installing and the contraction and expansion of the circuit in which it is included. It will be understood that the U-shaped copper strap 1 closes the circuit between the terminals 7, 7 and that any current flowing in this circuit will pass through the strap 1. This construction makes the instrument interchangeable with the ordinary jumper or fuse such as is used to connect electric circuits in manholes. One side of the U-shaped conductor is closed by block 10 of insulating material such as fibre, hard rubber or insulating compound. This block is held in place by screws 11 and serves as a support for the U-shaped conductor 1. The other side of the U is preferably closed by a plate 12 of fibre or other insulating material held in place by screws 13. The chamber thus formed encloses the movable parts of the instrument comprising a thermostat element 14 and a pointer 15 which cooperates with a scale 16.

The movable member 14 constitutes a bi-metallic strip fastened at its lower end to the inner side wall of the U-shaped conductor 1 by a bolt 17. A short distance above the bolt the bi-metallic strip is bent away from the wall to give it freedom of movement and is then bent again so that it extends substantially parallel to the wall. It will be understood that the strip 14 comprises two metals adapted to have different degrees of expansion when heated, the one adjacent the wall having the greatest coefficient of expansion so that when the chamber and the U-shaped conductor are at atmospheric temperature the upper end of the bi-metallic member will lie against the side wall near the top of the chamber and when the copper U-shaped conductor is heated by the passage of current therethrough the bi-metallic strip will be heated and bent in a well understood manner swinging its upper end away from the wall. The bi-metallic strip being totally enclosed in the chamber and being in good thermal contact therewith at its lower end is thus very efficiently heated and the loss of energy in the U-shaped conductor for accomplishing this result is not excessive. The thermostatic strip 14 cooperates with the pointer 15 which is pivoted near the base of the chamber on a stud 18 extending from the block 10 and held in place by a screw 19 extending through the pointer and stud and into the block 10. The upper end of the pointer is adapted to be moved along the scale 16 by the movement of the thermostatic member 14 when the latter is flexed away from its normal position. The scale 16 is cut in a metal plate arranged so as to be read from the top of the instrument. The scale plate is provided with bentover ears 20 by means of which it is secured to the block 10 by screws 21. The end of the pointer is preferably bent over the scale as illustrated. The scale plate 16 is provided with a serrated outer edge with which a projection 22 near the free end of the pointer cooperates to hold the pointer in any position to which it has been moved. It will be understood that the friction between the projection 22 and the serrated edge of the scale plate is slight so that the pointer may be readily moved by the thermostatic element 14. Instead of providing the friction device just described, I may provide sufficient friction at the pivot of the pointer for holding the pointer in adjusted position.

The U-shaped copper conductive element is made of such a section with respect to the normal current flow in the circuit for which it is to be used as will cause a sufficient temperature rise above atmosphere to obtain a readable deflection on the scale. Thermostatic metal strip 14 does not carry current itself but is heated directly by contact with the copper, the heat retained in the enclosed chamber contributing to some extent. The temperature rise of the copper strip above ambient temperature is made sufficiently great to permit the usual temperature compensating device to be dispensed with; that is to say, no appreciable error is introduced in the reading obtained due to changes in atmospheric temperature. The fact that the thermal responsive element is inclosed assists to some extent in making the instrument independent of ambient temperature changes. The scale is preferably arranged with a suppressed zero. In the present illustration I have shown the scale having ten equal divisions arbitrarily located, so that initial calibration by the customer is necessary. I have found that it is convenient to have the scale start at $\frac{7}{10}$ths normal load current and finish at double load current. When so arranged the operation of the device is as follows: the pointer 15 will initially be moved to the right opposite the point corresponding to $\frac{7}{10}$ths normal load current and against the upper end of the thermostatic element 14 when in the zero current position. When the line current through the copper conductor 1 is raised to $\frac{7}{10}$ths normal value, the thermostatic strip 14 will be in condition to start moving the pointer to the left. At about 1¼ normal load current the thermostat element 14 will be flexed to such an extent to move the pointer to some such position as illustrated near the middle of the scale. If the current now decreases, the thermostatic member will move back towards the initial position but the pointer will stay in the position shown and will be an indication of the maximum current load of the circuit. Should the line current reach double normal value at any time the pointer will be moved to the extreme left of the scale opposite the numeral 10. It is of course obvious that the scale might be calibrated directly in amperes or in percentages of normal load current.

I do not wish to be limited to the illustrated manner of attaching the cover plate 9 because in some cases it will be desirable to remove the cover plate for inspection and adjustment without removing the bolts which secure the U-shaped conductor to the line terminals 7, 7. Nor do I wish to be limited to the exact arrangement illustrated of attaching the line terminals. The terminal clips 2 and 3 are arranged in the present illustration to be interchangeable with the usual fuse jumper used in connecting underground circuits. However, these terminal clips may be arranged in various ways to suit local conditions. In certain cases the cover plate 9 may be omitted as illustrated in Fig. 1.

Although not limited thereto, the instrument is designed primarily for use in manholes to determine the load conditions of underground feeder circuits. The moving parts of the instrument are few in number, rugged in construction and totally enclosed. They are arranged to be unaffected by heavy vibrations and rough handling. The initial and maintenance cost of my instrument is extremely low and the instrument itself is suitable for use on either direct or alternating current circuits without the use of a shunt.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. A measuring instrument comprising a U-shaped current conducting element, a thermostatic member of the bimetallic type therein secured at one end to said element and indicating means cooperating with the free end of said thermostatic member.

2. A current measuring instrument comprising a U-shaped strap of conducting material, the ends of the U constituting the current terminals, a thermostatic member secured at one end to an inner wall of the U and indicating means moved by the free end of said thermostatic member.

3. A current measuring instrument comprising a U-shaped strap of conducting material the ends of which constitute the current terminals, insulating material closing the top and sides of the U and providing a support therefor, a thermostatic member secured at one end to an inner side wall of the U and indicating means moved by the free end of said thermostatic member.

4. A maximum reading ammeter comprising a U-shaped strap conductor, the ends of which constitute the current terminals of the ammeter, a block of insulating material contained in and closing up one side of said U, a pointer pivotally supported at its lower end by said insulating block, an indicating scale cooperating with the free end of said pointer, a thermostatic element adapted to be heated by the passage of current through said U-shaped conductor for moving said pointer and means for frictionally holding the pointer in the position to which it is moved.

5. In combination spaced terminals of an electric circuit, a U-shaped strap of conducting material adapted to be connected between said terminals to close the circuit, insulating means for closing the open sides of said U to form a closed chamber, a thermostatic member in said chamber secured at one end to a wall of said conductor and means moved by the other end of said thermostatic member in response to temperature changes to indicate the maximum current flow in said circuit.

6. A thermostatic electric measuring instrument comprising a heating element consisting of a U-shaped metal strap provided with terminals at the upper ends of the U for connecting said heating element in an electric circuit, means for closing the sides of said U-shaped strap so as to form a heating chamber and a heat responsive movable element supported in said chamber.

In witness whereof, I have hereunto set my hand this 16 day of January, 1922.

CHESTER I. HALL.